United States Patent [19]

Wolgemuth

[11] 4,020,023

[45] Apr. 26, 1977

[54] ADDITIVES FOR INCREASING THE DENSITY OF URETHANE FOAMS PREPARED FROM ADNC

[75] Inventor: Larry G. Wolgemuth, Flossmoor, Ill.

[73] Assignee: Atlantic Richfield Company, Los Angeles, Calif.

[22] Filed: Jan. 8, 1974

[21] Appl. No.: 539,471

Related U.S. Application Data

[63] Continuation-in-part of Ser. No. 351,695, April 16, 1973, abandoned.

[52] U.S. Cl. .................. 260/2.5 A; 260/2.5 AK
[51] Int. Cl.² ............... C08G 13/00; C08G 18/80
[58] Field of Search ...... 260/2.5 A, 77.5 B, 2.5 AK

[56] References Cited

UNITED STATES PATENTS

| | | | |
|---|---|---|---|
| 2,650,212 | 8/1953 | Windemuth | 260/2.5 AN |
| 3,531,425 | 9/1970 | Burk | 260/37 N |
| 3,652,507 | 3/1972 | Burk | 260/77.5 B |
| 3,702,320 | 11/1972 | Fritok | 260/2.5 A |
| 3,746,667 | 7/1973 | Dieter | 260/2.5 A |
| 3,766,147 | 10/1973 | Wolgemuth | 260/77.5 R |

*Primary Examiner*—C. Warren Ivy
*Attorney, Agent, or Firm*—Coleman R. Reap

[57] ABSTRACT

Polyurethane-type compositions are prepared by reacting cyclic nitrile carbonates or oxalates with organic nucleophilic compounds, e.g., polyols, polythiols or polyamines in the presence of a sufficient amount of calcium and/or barium oxide to take up all or a portion of the carbon dioxide produced during the reaction between the cyclic nitrile carbonates and the nucleophilic compounds.

11 Claims, No Drawings

ADDITIVES FOR INCREASING THE DENSITY OF URETHANE FOAMS PREPARED FROM ADNC

This application is a Continuation-In-Part of application Ser. No. 351,695, filed Apr. 16, 1973, now abandoned.

BACKGROUND OF THE INVENTION

1. FIELD OF THE INVENTION

This invention concerns preparation of urethane-type polymers and more particularly the preparation of urethane-type polymers by the condensation-rearrangement of cyclic nitrile carbonates and oxalates with organic nucleophilic compounds.

2. PRIOR ART

U.S. Pat. No. 3,531,425 describes the preparation of a novel class of urethane-type polymers obtained by condensing various nitrile carbonates, sulfites or oxalates with nucleophilic compounds such as polyols, polythiols, and polyamines. This condensing-rearrangement reaction may be used to produce elastomers, films and foams depending upon the nature of the reactants and the particular conditions under which the reaction is carried out. U.S. Pat. No. 3,652,507 describes the preparation of high molecular weight polymers by the same type reaction, the high molecular weight products being obtained by the use of specific catalysts. Co-pending U.S. Patent Application Ser. No. 182,529, filed Sept. 21, 1971 discloses a method of preparing polyurethane-type foams by the above reaction, again with the use of specific catalysts now U.S. Pat. No. 3,746,667. U.S. Pat. No. 3,256,213 discloses a method of preparing cellular polyurethane-type polymers by reacting isocyanates with polyamino compounds, the innovative feature being the reduction of the reactivity of the polyamino compound by reaction with carbon dioxide to permit thorough mixing of the reactants before reaction takes place. The polyamino compound is reactivated by reaction with a metallic oxide. The disclosures of the above patents and application are incorporated herein by reference.

The above-described method of preparation of polyurethane-type polymers by the condensation-rearrangement of cyclic nitrile compounds with organic nucleophilic compounds is somewhat complicated by the fact that upon reaction of the cyclic nitriles and nucleophilic compounds one mole of a gas, sulfur dioxide, carbon monoxide or carbon dioxide (a mole each of carbon monoxide and carbon dioxide when cyclic nitrile oxalates are used) is produced for each condensation of a cyclic nitrile group and a nucleophilic group. Thus, if it is desired to produce a thermoplastic polymer, such as a fiber or a film, it is necessary to carry out the reaction under carefully controlled conditions to allow the released gas to escape without affecting the integrity of the fiber or film. Furthermore, when foams are prepared by the above-described process, the density of the foam is more or less determined by the amount of released gas that is available for foaming purposes. The density of the foam could be reduced by the use of additional blowing agents but it is difficult to produce foams of greater density than would naturally occur by the release of the fixed amount of gas formed by the condensation-rearrangement of the reactants. Thus, the produce foams of density greater than would be automatically produced by the stoichiometric amount of gas released, the reaction must be carried out under specific conditions or the reactants must be carefully selected to produce a given amount of released gas per unit weight of product. These restrictions are cumbersome and it is sometimes difficult to produce a product having the desired properties.

A method has now been discovered which eliminates the above difficulties when a cyclic nitrile compound is used which, upon reaction, produces carbon dioxide. This newly discovered method makes it possible to produce polyurethane-type elastomers and films by the condensation-rearrangement reaction between cyclic nitrile compounds and organic nucleophilic compounds without concern over the amount or rate of release of carbon dioxide from the forming product. Furthermore, it is possible, by virtue of this invention, to produce, without difficulty, polyurethane-type foam materials of high density.

Accordingly, it is an object of the invention to present an improved process for the preparation of urethane-type polymers by the condensation-rearrangement reaction between carbon dioxide-producing cyclic nitrile compounds and nucleophilic compounds.

It is a second object to present an improved process for the preparation of high density foamed urethane-type polymers by the reaction of carbon-dioxide producing cyclic nitrile compounds and nucleophilic compounds.

It is a third method of the invention to present novel high density urethane-type polymers.

It is a fourth object of the invention to present a method of eliminating or controlling the amount of free carbon dioxide in products being formed by the reaction of cyclic nitrile carbonates and/or oxalates and organic nucleophilic compounds.

These and other objects will become more apparent from the following description and examples.

According to the invention, urethane-type polymers are prepared by the reaction of carbon dioxide-producing cyclic nitrile compounds with organic nucleophilic compounds in the presence of calcium oxide, barium oxide or mixtures of these. The preferred carbon dioxide-producing compounds are the cyclic nitrile carbonates. The calcium and/or barium oxide may be present in an amount to consume all or any portion of the carbon dioxide produced in the condensation-rearrangement reaction.

DESCRIPTION OF THE INVENTION

DEFINITIONS

The term polyurethane-type polymers is used herein to describe the polymeric compounds obtained when a cyclic nitrile compound reacts with a nucleophilic compound to produce a polyurethane, polyurea, polythiourea or mixtures of any or all of these.

The term cyclic nitrile compound is used to describe compounds containing.

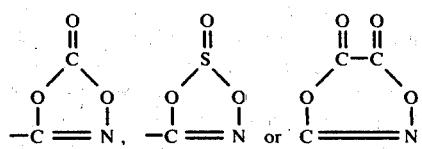

groups.

The term organic nucleophilic group is used to describe organic compounds having active hydrogen atoms as determined by the Zerewitinoff test, i.e., compounds which, when added to a Grignard solution of methyl iodide, liberate methane by decomposition of Grignard reagent.

THE CYCLIC NITRILE COMPOUNDS

The carbon dioxide-producing cyclic nitrile compounds used in the process of the invention have the structure

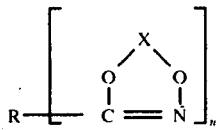

wherein X is carbonyl,

or oxalyl,

$n$ is at least 2 and R is an organic radical having from 2 to about 200,000 carbon atoms and is free of reactive hydrogens as determined by the Zerewitinoff test. Generally, R will consist essentially of carbon and hydrogen but there can be included therein other elements as well, as long as they do not materially affect the radical's basic characteristic of being non-interfering in the condensation-rearrangement reaction between the cyclic nitrile carbonate or oxalate and the reactive hydrogen group of the organic nucleophilic compound. Examples of such non-interfering groups are alkoxy, nitro, and halo groups. R can be saturated or ethylenically or acetylenically unsaturated, aliphatic radicals, saturated or ethylenically unsaturated cycloaliphatic radicals or aromatic radicals, including alkaryl, aralkyl, and fused ring aromatic radicals.

R often contains from 2 to 50 carbon atoms when it is aliphatic and from 6 to 30 carbon atoms when it is aromatic. When R has a content in this range, it preferably contains 2 to 12 carbon atoms when aliphatic and 6 to 18 carbon atoms when aromatic. R may also be of much higher molecular weight and may contain up to 200,000 or more carbon atoms. Cyclic nitrile compounds in which R has a high molecular weight may be prepared, for instance, by polymerizing unsaturated cyclic nitrile compounds such as acrylonitrile carbonate. The preparation of cyclic nitrile compounds of this type is disclosed in U.S. Pat. No. 3,480,595, the disclosure of which is incorporated herein by reference.

The number of carbon dioxide-producing functional groups present in the cyclic nitrile compounds used in the invention is at least 2 and is often as high as 100,000 or more. Thus, $n$, in the above structural formula, is at least 2. In preparing high molecular weight thermoplastic polymers, it is usually desirable that $n$ be about 2. On the other hand, when formed materials are to be prepared, $n$ may be very much higher than 2, depending upon the type of foam being prepared. In one preferred embodiment of the invention $n$ varies from 2 to about 6.

The preparation of the cyclic nitrile carbonates and oxalates useful in the invention forms no part of the invention, and one desiring to explore their preparation may refer to the above-mentioned patents and U.S. Pat. Nos. 3,507,900; 3,560,492; 3,609,163; and 3,658,805, all of which are incorporated herein by reference.

As can be readily appreciated, when cyclic nitrile carbonate groups react with nucleophilic groups, one mole of carbon dioxide is produced for each cyclic nitrile carbonate and nucleophilic group that reacts as follows:

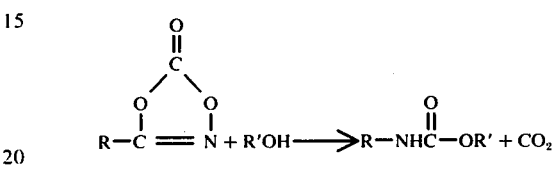

whereas when cyclic nitrile oxalate groups react with nucleophilic groups, one mole of carbon dioxide and one mole of carbon monoxide are produced for each cyclic nitrile oxalate and nucleophilic group that reacts:

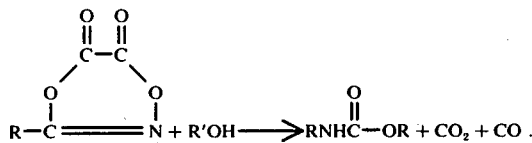

Thus, it is often desirable, particularly when preparing thermoplastic fibers and films, to use a cyclic nitrile carbonate as the cyclic nitrile compound since the carbon dioxide acceptors disclosed have no effect on carbon monoxide. The preferred carbon dioxide-producing cyclic nitrile compounds for use in the invention are the cyclic nitrile carbonates having 2-12 carbon atoms. A particularly suitable cyclic nitrile carbonate is adipodi(nitrile carbonate).

Typical of the aliphatic carbon-dioxide-producing cyclic nitrile compounds useful in the invention are:

1. Saturated aliphatic and cycloaliphatic compounds such as 1,2-ethane di(nitrile carbonate); 1,3-propane di(nitrile oxalate); 1,4-butane di(nitrile carbonate); 1,20-eicosane di (nitrile carbonate); 1,40-tetracontane di(nitrile oxalate); 5-ethyl-1,16-hexadicane-di(nitrile carbonate); 1,3,5-pentane tri(nitrile carbonate); 1,4,6,10-decane tetra(nitrile carbonate); 6-methyl-1,5,8-octane tri(nitrile oxalate); 1,4-cyclohexane di(nitrile carbonate); 2-ethyl-1,3,5-cyclohexane tri(nitrile oxalate); etc.

2. Unsaturated aliphatic and cycloaliphatic compounds such as 1,2-ethane-di(nitrile carbonate); 1,4-butene-2-di(nitrile oxalate); 1,6,9-nonene-2-tri(nitrile carbonate); 3 -propyl-1,5,7-heptene-2-tri(nitrile oxalate; 1,4-butyne-2-di(nitrile carbonate); 1,6-hexyne-2-di(nitrile oxalate); 1,4-cyclo-hexane-2-di(nitrile carbonate); etc.

3. Aromatic compounds such as benzene-1,3-di (nitrile carbonate); benzene-1,4-di(nitrile oxalate); 1,4-dimethylbenzene-2,5-di(nitrile carbonate); and 1,3-diethylbenzene-2,4-di(nitrile oxalate); methylbenzenedi(nitrile carbonate); 1-benzylbenzene-2,4-di(nitrile oxalate); naphthalene-1,7-di(nitrile carbonate);

1,2,3,4-tetrahydronaphthalenedi(nitrile carbonate); 2,2-diphenylpropane-p,p'-di(nitrile carbonate); diphenylmethane-p,p'-di(nitrile carbonate); anthracene-2,8-di(nitrile carbonate); 1,2-diphenylethane-p,p'-di(nitrile oxalate); biphenyldi(nitrile carbonate); 1,2-diphenylethane-o,o'-di(nitrile carbonate); stilbene-p,p'-di(nitrile carbonate); and stilbene-o,o'-di(nitrile oxalate).

As stated above, the preferred carbon-dioxide producing cyclic nitrile compounds are the saturated aliphatic cyclic nitrile cabonates containing 2-12 carbon atoms such as 1,2-ethane di(nitrile carbonate); 1,4-butane-di(nitrile carbonate; and 1,4,8-octane tri(nitrile carbonate).

The nucleophilic organic compounds useful in the invention may be polyols, polythiols or polyamines having active hydrogen atoms bonded to oxygen, sulfur or nitrogen which can be reacted with the cyclic nitrile carbonates and/or oxalates. Preferred nucleophilic compounds are any of the polyhydroxy compounds that react with isocyanates to yield polyurethanes.

Useful nucleophilic compounds include such polyols, polythiols or primary and/or secondary polyamines as aliphatic, aromatic or polyester, polyether and polyacetones, and similar compounds having from 2 to 6 or more, but preferably 3 or more, —OH, —SH or $NH_2$ groups per molecule and having molecular weights ranging from 62 for ethylene glycol to 75,000 or higher with hydroxyl numbers ranging from 12 to 1,100 or more. Mixtures of two or more of these compounds can also be employed The aliphatic and aromatic polyols, polythiols, and polyamines include, for example, ethylene glycol; diethylene glycol; thiodiethylene glycol; ethylene diamine; propylene glycol; 1,3-butylene glycol; diethylene triamine; 1,6-hexanediol; butenediol; butynediol; amylene glycols; 2-methylpentanediol-2,4; 1,7-heptanediol; glycerine; neopentyl glycol; trimethylol propane; triethanol amine; pentaerythritol; cyclohexane dimethanol; sorbitol; mannitol; glactitol; talitol; xylitol; 1,2,5,6-tetrahydroxyhexane; styrene glycol; bis($\beta$-hydroxyethyl)diphenyl-dimethylmethane; silanediols; e.g., triphenyl silanols; 1,4-dihydroxybenzene; and the thiol and amine analogues thereof.

The active hydrogen-containing nucleophilic polymeric compounds useful in this invention include, for instance, polyhydric polyalkylene ethers; hydroxyl polyesters; hydroxyl group containing, preferably hydroxyl group terminated, polymers; and the thiol and amine analogues thereof. The polyhydric polyalkylene ethers may have a molecular weight greater than about 750 and a hydroxyl number of from about 10 to 600 and may be derived, for example, by the polymerization of alkylene oxides such as ethylene oxide, propylene oxide, butylene oxide, and the like. Polyhydric polyalkylene ethers may also be prepared by the polymerization of the cyclic ethers such as, for example dioxane, tetrahydrofuran, and the like, and by the condensation of an alkylene oxide with a glycol such as ethylene glycol, propylene glycol, butylene glycol, and the like.

The hydroxy-containing polyesters may be obtained by the reaction of aliphatic or aromatic dicarboxylic acids with aliphatic or aromatic polyhydric alcohols in the manner well known in the art in proportions that result in esters having at least two reactive hydroxy groups. Any polyols, polythiols or polyamines may be used to form the hydroxy, thiol or amine esters and illustrative of such alcohols are those listed above in the discussion of suitable alcohols as the active hydrogen-containing reactant. Included within the suitable esters are the diglycerides and hydroxyl-containing castor oil, tall oil, soya oil, linseed oil, etc. The latter esters are usually prepolymers prepared by the reaction of the fatty glyceride with low molecular weight polyols. Illustrative, for instance of castor oil-based prepolymers are propylene glycol monoricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride or ricinoleic acid, epoxidized castor oil, and pentaerythitol tetraricinoleate. Other suitable polymeric compounds include the hydroxyl-, thiol- or amine-terminated olefin polymers such as those of 1,4-butadiene; isoprene; 2,3-dimethylbutadiene; 2-chloro-1,3-butadiene; 2-cyano-1,3-butadiene; and other polymerizable ethylenically unsaturated monomers such as $\alpha$-olefins of up to 12 carbon atoms such as ethylene, propylene, butene, etc.; styrene, acrylonitrile, acrylic acid or ester, methacrylic acid or ester, vinyl chloride, vinlidine chloride, and the like; hydroxyl-terminated condensates of phenol and lower aldehydes and hydroxy-terminated polyepoxides.

The functionality of both the cyclic nitrile component and the nucleophilic group-containing component is at least two and may extend to very high values depending upon the type of product that is being prepared. In manufacturing elastomeric polymers, it is desirable that the functionality of both components be in the neighborhood of about 2 groups per molecule. This permits the preparation of very high molecular weight polymers with little cross-linking. On the other hand, when it is desired to produce rigid urethane-type polymers, it is often desirable that the functionality of one or both of the reacting components be greater than two and sometimes considerably higher than two. In general, it is preferred that the cyclic nitrile components used have a functionality of two and the functionality of the nucleophilic component be varied since it is much more economical to prepare polyfunctional nucleophilic compounds than polyfunctional cyclic nitrile compounds.

The ratio of cyclic nitrile compound to nucleophilic compound may vary depending upon the type of product being prepared and the functionality of the reacting materials. In general, it is desired to use amounts of cyclic nitrile compound and nucleophilic compound that will provide a ratio of cyclic nitrile functional group to nucleophilic group of about 0.7 to 10:1 and preferably about 0.7 to 1.4:1.

The reaction of this invention may be carried out by thermal initiation, however, it is usually preferred to add a catalyst to facilitate reaction at lower temperatures and in shorter periods of time.

Suitable catalysts for the compositions of the invention are those generally found useful to catalyze the reaction between cyclic nitriles and reactive hydrogen-containing compounds. The following catalysts are typical of those which may be used in the compositions of the invention. The catalyst may be a basic material such as a tertiary amine having a PKa value greater than 3, e.g., triethylamine, as disclosed in U.S. Pat. No. 3,531,425, the disclosure of which is incorporated herein by reference. Another catalyst for use in accordance with the present invention is a combination of a first metal selected from Groups III through V of the Periodic System and a second metal selected from Groups I and III and the iron series of Group VIII of the Periodic System as disclosed in U.S. Pat. No. 3,652,507, which disclosure is incorporated herein by reference.

Yet another useful catalyst in accordance with the present invention is set forth in U.S. Pat. No. 3,702,320 which disclosure is also incorporated herein by reference. According to the disclosure of this patent, six of the metals disclosed in U.S. Pat. No. 3,652,507 as being suitable for use in the multi-metal catalyst of the latter patent can be used effectively even when not in combination with other metals, provided that reaction temperatures in the range of about 120°–150° C. are used. These metals are tin, titanium, zinc, bismuth, aluminum, and iron. The urethane-forming condensation reaction is catalyzed by contacting the reactants with a catalytically-effective amount of a compound of aluminum, tin, titanium, zinc, bismuth, or iron dissolved in the reaction mixture. When the metal compound is a compound of aluminum, tin, titanium or bismuth the reaction is run in the substantial absence of metals of Groups I, II, and the iron series of Group VIII of The Periodic Chart of the Elements and when the metal compound is a compound of zinc or iron, the reaction is run in the substantial absence of metals of Groups III through V of The Periodic Chart.

Other catalysts useful in the present invention are the organic and inorganic fluorides, as disclosed in U.S. Pat. No. 3,766,147, the disclosure of which is incorporated herein by reference. Still other catalysts useful in the present invention are the N-oxides of amines. The use of these catalysts is disclosed in U.S. Pat. No. 3,793,254 and the disclosure of which is incorporated herein by reference. The preferred catalysts are the tertiary aliphatic, aromatic, and heterocyclic tertiary amines such as triethylene diamine, pyridine, N-ethyl morpholine, and N,N-dimethyl aniline. The catalyst, when present, is used at a concentration of about 0.001 to 10% and preferably about 0.01 to 2.0% based on the total weight of solids in the formulation.

Calcium oxide and barium oxide have been found to have unexpected utility compared to other metallic oxides in absorbing carbon dioxide without otherwise affecting the desired reaction or modifying the product properties. These compounds form calcium carbonate and barium carbonate upon reaction with carbon dioxide. These carbonates can remain in the product as filler material. In fact, they often improve the properties of urethane-type polymers such as flexible foam materials. Alkali metal oxides, on the other hand, are much too reactive and compete with the polyol hydroxyl groups for the isocyanate groups. Furthermore, alkali metal oxides are much more basic than calcium or barium oxide and may tend to catalyze the reaction, thereby destroying the uniformity of the product. Metal hydroxides are unsuitable in the reaction since they release water upon reaction with carbon dioxide. The water, in turn, reacts with isocyanate groups to produce additional carbon dioxide. This not only defeats the purpose of the use of the cabon dioxide absorbers but may also result in the termination of the reaction.

The amount of calcium and/or barium oxide used in the invention may vary depending upon the result desired. If a non-cellular product is desired, an amount of calcium and/or barium oxide which will combine with all of the carbon dioxide produced is preferred. In such a case, it is preferred to use cyclic nitrile carbonates as the cyclic nitrile component since cyclic nitrile oxalates produce carbon monoxide, which is not usually affected by the calcium and/or barium oxide. When foam materials are being prepared, the amount of calcium and/or brium oxide may be varied depending upon how dense a product it is desired to prepare. Thus, the density of compositions produced in accordance with the invention may be varied from slightly greater than would inherently result if no calcium or barium oxide were added to that of non-foamed compositions.

The reaction may be performed in bulk, i.e., in the absence of a solvent or, if desired, in the presence of an inert solvent. By inert is meant that the solvent is free of substituents that will interfere with the desired reaction. Examples of suitable inert solvents are aromatic hydrocarbons, esters, ethers, and ketones which are free of reactive hydrogen as determined by the Zerewitinoff test. It is often preferred to carry out the reaction without the use of solvents.

The temperature at which reaction takes place usually varies berween about 60° and 200° C. In general, it is preferable to carry out the reaction at a temperature of about 70° to 150° C. The pressure at which the reaction is carried out may be subatmospheric, atmospheric or superatmospheric.

In addition to the essential components, other materials may be included in the formulation. Thus, fillers such as carbon black, talcum, chopped glass fibers, etc.; colorants, including pigments and dyes; surfactants such as silicone oils and emulsifiers, etc. may be added to the formulation. Similarly, other polymeric or monomeric materials, chain transfer agents, etc. may be added to the formulation to produce the desired product.

In accordance with the preferred embodiment of the invention, the reactants, including one or more cyclic nitrile carbonate and/or cyclic nitrile oxalate, one or more hydroxyl, thiol, and/or amine containing compound; the calcium and/or barium oxide; catalyst, if used; and other additives are combined in a suitable reactor which has been purged of oxygen, the temperature of the reactants is raised to the reaction temperature and the reaction is permitted to proceed to completion, including a curing step. If desired, one or more of the reactants can be added during the reaction in one or more increments or on a continuous basis. Upon completion of the reaction, the product is cooled and recovered. A shelf stable reaction mixture suitable for later reacting as, for example, coatings, may, of course, be prepared by the proper selection of the reactants, catalyst, etc.

The invention is further illustrated in the following example in which parts and percentages are on a weight basis, unless otherwise indicated.

EXAMPLE I

To a one liter resin kettle, equipped with a mechanical stirrer, a nitrogen inlet and exit port and heated by an oil bath, was added 500 g. of an ethylene oxide capped polypropyleneether triol of glycerol (mol. wt. 3,000, hydroxyl No. 55.6). This material was heated at 100° C. and degassed for one hour at 5 mm Hg then cooled to room temperature under a nitrogen atmosphere. To this was added a solution consisting of 1.5 grams of sodium aluminum hydride dissolved in 40 ml. of anhydrous ethanol. The mixture was stirred and again degassed at 100° C. for one hour at 5 mm Hg to remove the ethanol.

A 30 ml. aliquot of the above triol solution was added to a 100 ml. thimble which was heated to 100° C. by an oil bath. To this thimble was also added a silicone surfactant (0.5 g.) and adipodi(nitrile carbonate) (3.44 g.). The resulting mixture was allowed to heat for two minutes then stirred for 30 seconds with a high speed stirrer and transferred to a one liter polypropylene beaker that was heated at 100° C. by an oil bath. The exposed surface of the mixture was heated by an IR lamp. Within five minutes a foam having a volume of 492 ml had formed.

EXAMPLE II

The procedure of Example I was repeated except that 0.1 grams of calcium oxide was added to the reaction mixture. The foam produced had a volume of 394 ml.

EXAMPLE III

The procedure of Example I was repeated except that 0.5 gram of calcium oxide was added to the reaction mixture. The foam produced had a volume of 369 ml.

EXAMPLE IV

The procedure of Example I was repeated except that 0.7 gram of calcium oxide was added to the reaction mixture. The foam produced had a volume of 246 ml.

EXAMPLE V

The procedure of Example I was repeated except that 1.0 grams of calcium oxide was added to the reaction mixture. The foam produced had a volume of 49 ml.

The following table lists the results of these reactions:

| Reaction No. | Amount of CaO (g.) | Volume of Resulting Foam (ml) |
|---|---|---|
| 1 | 0 | 492 |
| 2 | 0.1 | 394 |
| 3 | 0.5 | 369 |
| 4 | 0.7 | 246 |
| 5 | 1.0 | 49 |

Although the invention has been described with particular reference to specific examples, it is understood that the scope of the invention is not limited thereto but is to be limited only by the breadth of the appended claims.

I claim:

1. In a process for preparing a polymeric composition by condensing-rearranging a cyclic nitrile compound of the structural formula

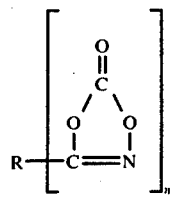

wherein R is an organic radical free of reactive hydrogen atoms as determined by the Zerewithinoff test, and $n$ is at least 2 with an organic compound containing at least two functional groups selected from the group consisting of hydroxyl, thiol, primary amine, secondary amine, and mixtures of these, the improvement comprising carrying out the reaction in the presence of a sufficient amount of a metal oxide selected from the group consisting of calcium oxide, barium oxide, or mixtures of these to produce a composition having the desired density.

2. The improved process of claim 1 wherein the metallic oxide is present in an amount sufficient to combine with all of the carbon dioxide released from the cyclic nitrile compound.

3. The improved process of claim 1 wherein the metallic oxide is present in an amount less than is sufficient to combine with all of the carbon dioxide released from the cyclic nitrile compound.

4. The improved process of claim 1 wherein R is a hydrocarbon radical.

5. The improved process of claim 4 wherein $n$ is 2 to about 6.

6. The improved process of claim 1 wherein the functional grops on the organic compound are predominantly hydroxyl groups.

7. The improved process of claim 1 wherein the cyclic nitrile compound is adipodi(nitrile carbonate) and the organic compound is a polyol.

8. The process of claim 7 wherein said polyol is a polyester polyol or a polyether polyol.

9. A method of increasing the density of urethane foams prepared by the reaction of cyclic nitrile carbonates of the formula

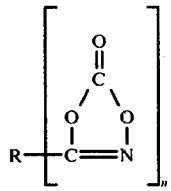

wherein R is a hydrocarbon radical of 2 to 12 carbon atoms and free of reactive hydrogen atoms as determined by the Zerewitinoff test and $n$ is 2 to 6, with an organic polyhydroxyl-containing compound having a molecular weight greater than about 750 to 10,000 and hydroxyl numbers of 10 to about 600 by reacting the cyclic nitrile carbonate and organic polyhydroxyl containing compounds in the presence of a metallic oxide selected from the group consisting of calcium oxide, barium oxide, and mixtures of these, acid metallic oxide being present in an amount sufficient to produce a foam having the desired density.

10. The process of claim 9 wherein the cyclic nitrile carbonate is adipodi(nitrile carbonate) and the metallic oxide is calcium oxide.

11. A high density cellular polyurethane composition prepared by reacting adipodi(nitrile carbonate) with a polyester polyol or polyether polyol having a molecular weight of greater than about 750 and a hydroxyl number of about 10 to 600 in the presence of calcium oxide, barium oxide, or mixtures of these.

* * * * *

UNITED STATES PATENT OFFICE
CERTIFICATE OF CORRECTION

Patent No. 4,020,023            Dated April 26, 1977

Inventor(s) Larry G. Wolgemuth

It is certified that error appears in the above-identified patent and that said Letters Patent are hereby corrected as shown below:

Claim 6, line 25, "groups" should be -- groups --.

Claim 9, line 54, "acid" should be -- said --.

Signed and Sealed this fifth Day of July 1977

[SEAL]

*Attest:*

RUTH C. MASON
*Attesting Officer*

C. MARSHALL DANN
*Commissioner of Patents and Trademarks*

UNITED STATES PATENT OFFICE
CERTIFICATE OF CORRECTION

Patent No. 4,020,023          Dated April 26, 1977

Inventor(s) Larry G. Wolgemuth

It is certified that error appears in the above-identified patent and that said Letters Patent are hereby corrected as shown below:

The filing date for this application was January 8, 1975 as per attached copy of mailroom stamp received from the Patent Office.

Signed and Sealed this sixteenth Day of August 1977

[SEAL]

Attest:

RUTH C. MASON
*Attesting Officer*

C. MARSHALL DANN
*Commissioner of Patents and Trademarks*